US012724187B2

(12) United States Patent
Heo

(10) Patent No.: US 12,724,187 B2
(45) Date of Patent: Sep. 1, 2026

(54) OPTICAL FILTER

(71) Applicant: CHANGKANG CHEMICAL CO., LTD., Ansan-si (KR)

(72) Inventor: Young Tae Heo, Ansan-si (KR)

(73) Assignee: CHANGKANG CHEMICAL CO., LTD., Ansan-si (KR)

( * ) Notice: Subject to any disclaimer, the term of this patent is extended or adjusted under 35 U.S.C. 154(b) by 670 days.

(21) Appl. No.: 18/178,045

(22) Filed: Mar. 3, 2023

(65) Prior Publication Data

US 2023/0204835 A1 Jun. 29, 2023

Related U.S. Application Data

(63) Continuation of application No. PCT/KR2021/010501, filed on Aug. 9, 2021.

(30) Foreign Application Priority Data

Sep. 22, 2020 (KR) ........................ 10-2020-0122458

(51) Int. Cl.
*G02B 5/28* (2006.01)
*G02B 5/20* (2006.01)
*G03B 11/00* (2021.01)

(52) U.S. Cl.
CPC ............. *G02B 5/283* (2013.01); *G02B 5/208* (2013.01); *G02B 5/281* (2013.01); *G03B 11/00* (2013.01)

(58) Field of Classification Search
None
See application file for complete search history.

(56) References Cited

U.S. PATENT DOCUMENTS 6,310,729 B1 * 10/2001 Tsukamoto ............ G02B 5/285
359/583
2015/0293284 A1 10/2015 Tatemura
2016/0282531 A1 9/2016 Murayama et al.
2017/0192144 A1 7/2017 Ooi et al.
(Continued)

FOREIGN PATENT DOCUMENTS

JP 2009051010 A 3/2009
JP 2009053249 A 3/2009
(Continued)

OTHER PUBLICATIONS

Schott, "Specification D 263 T eco Technical properties", pp. 1-4, 2017. Retrieved from the world wide web Nov. 14, 2025 at <https://www.advancedoptics.com/D%20263%20T%20eco%20PCTP%20english.pdf> (Year: 2017).*
(Continued)

*Primary Examiner* — Derek S. Chapel
(74) *Attorney, Agent, or Firm* — NKL LAW; Jae Youn Kim

(57) ABSTRACT

In the present application, a sharp visible light transmission band can be obtained while efficiently and accurately blocking ultraviolet light near the short-wavelength visible light region and infrared light near the long-wavelength visible light region, and the ripple phenomenon can be minimized regardless of the incident angle. It is possible to provide an optical filter capable of obtaining high visible light transmittance while securing the above characteristics even in the case where a near-infrared absorption glass is used as a substrate.

12 Claims, 10 Drawing Sheets

201
100
202

(56) References Cited

U.S. PATENT DOCUMENTS

| | | | | |
|---|---|---|---|---|
| 2018/0017721 | A1 | 1/2018 | Nagaya et al. | |
| 2018/0095203 | A1 | 4/2018 | Ooi et al. | |
| 2018/0259697 | A1* | 9/2018 | Hung | G02B 5/285 |
| 2019/0219749 | A1 | 7/2019 | Shimmo et al. | |
| 2020/0119071 | A1 | 4/2020 | Takishita et al. | |
| 2020/0379150 | A1 | 12/2020 | Takagi et al. | |

FOREIGN PATENT DOCUMENTS

| | | | |
|---|---|---|---|
| JP | 2010249964 | A | 11/2010 |
| JP | 2019-066742 | A | 4/2019 |
| JP | 2019066814 | A | 4/2019 |
| KR | 20150100618 | A | 9/2015 |
| KR | 10-2017-0086018 | A | 7/2017 |
| KR | 10-2018-0033114 | A | 4/2018 |
| KR | 10-2019-0139316 | A | 12/2019 |
| KR | 20200096221 | A | 8/2020 |

OTHER PUBLICATIONS

RefractiveIndex.INFO, “Refractive index of SiO2 (Silicon dioxide, Silica, Quartz)-Malitson”. pp. 1-3, 2025. Retrieved from the world wide web Nov. 14, 2025 at <https://refractiveindex.info/?shelf=main&book=SiO2&page=Malitson> (Year: 2025).*

RefractiveIndex.INFO, “Refractive index of TiO2 (Titanium dioxide)-Devore-o”. pp. 1-3, 2025. Retrieved from the world wide web Nov. 14, 2025 at <https://refractiveindex.info/?shelf=main&book=TiO2&page=Devore-o> (Year: 2025).*

* cited by examiner

| 200 |
| --- |
| 100 |

FIG. 1

| 201 |
| --- |
| 100 |
| 202 |

FIG. 2

| 201 |
| --- |
| 300 |
| 100 |
| 202 |

FIG. 3

| 201 |
| --- |
| 301 |
| 302 |
| 100 |
| 202 |

FIG. 4

| 201 |
| --- |
| 301 |
| 100 |
| 302 |
| 202 |

FIG. 5

OPTICAL FILTER

TECHNICAL FIELD

This application relates to an optical filter.

BACKGROUND TECHNOLOGY

For imaging capturing device using an imaging sensing component such as a CCD or a CMOS image sensor, an optical filter that transmits visible light and blocks infrared light such as near-infrared light is used to obtain good color reproducibility and a clear image and it is also called as a near-infrared cut filter.

For such an optical filter, it is required to show a transmittance curve that transmits visible light and blocks ultraviolet light and infrared light.

However, it is not easy to accurately block ultraviolet light near the short wavelength and infrared light in the long wavelength region of visible light and to obtain a high transmittance curve for the transmittance of visible light.

As a known optical filter, a reflective layer including an absorption layer containing a near-infrared absorption dye and a dielectric film that blocks light in the ultraviolet and infrared wavelength region is known (for example, Patent Document 1, Korean Patent Registration No. 10-2056613). The dielectric film has a characteristic that the transmittance curve changes (shifts) according to the incident angle. Therefore, for the optical filter in Patent Document 1, an absorption layer containing a near-infrared absorption dye having a small incident angle dependence of transmittance is applied to compensate for the disadvantages of the dielectric film.

An optical filter utilizing a so-called near-infrared absorption glass (also called a blue glass) as a substrate having near-infrared absorption properties itself is also known. The near-infrared absorption glass is a glass filter where CuO or the like is added to a fluorophosphate-based glass or a phosphate-based glass to selectively absorb light in the near-infrared wavelength region. However, in the case of applying such near-infrared glass, it is difficult to obtain a sharp transmittance band of visible light by accurately blocking ultraviolet light in the vicinity of a short wavelength region of visible light and infrared light in the long wavelength region of visible light. In addition, high transmittance within the visible light transmittance band cannot be obtained due to the properties of the near-infrared absorption glass itself.

On the other hand, in the conventional optical filter, a phenomenon of periodic transmittance fluctuation (so-called ripple phenomenon) occurs in the visible light transmission region.

The ripple phenomenon is that a phenomenon of the actual transmittance in a specific area increasing and decreasing with respect to the average transmittance of the corresponding area is periodically observed.

An imaging capturing device senses visible light transmitted through an optical filter by a sensor for each corresponding RGB (Red, Green, Blue) color. In the above, the sensitivity and the like of each sensor of RGB are adjusted in consideration of the average transmittance for each wavelength and if the ripple phenomenon occurs, color reproducibility is deteriorated due to the fluctuation in the light where the sensor recognizes.

In addition, the ripple phenomenon may generate a region (so-called a bunk region) where the transmittance of the visible light region is momentarily dropped and consequently, it causes a ghost phenomenon, and this ghost phenomenon also deteriorates color reproducibility.

In the prior art, to prevent the ripple phenomenon or the ghost phenomenon as described above, a method of shifting the thickness of each sub-layer in a dielectric film mainly composed of multi-layered sub-layers by 10% or so is adopted. It cannot be effectively prevented, and particularly, it is very difficult to prevent the ripple phenomenon occurring with respect to the angle of incidence.

In addition, in a region where the ripple phenomenon with respect to the angle of incidence is severe is a wavelength region of about 400 nm to 600 nm in the visible light region, and there is no consideration of such a wavelength region in the prior art.

DETAILED DESCRIPTION OF THE INVENTION

Technical Challenges

An object of the present application is to provide an optical filter. In the present application, it is possible to obtain a sharp visible light transmission band while efficiently and accurately blocking ultraviolet light near the short-wavelength visible light region and the infrared light near the long-wavelength visible light region, and to provide an optical filter capable of minimizing the ripple phenomenon regardless of the angle of incidence for one purpose. In addition, an object of the present application is to provide an optical filter capable of obtaining high visible light transmittance while securing the above characteristics even when a near-infrared absorption glass is applied as a substrate.

Technical Solution

An optical filter according to an embodiment of the present application includes a transparent substrate and a dielectric film formed on one or both surfaces of the transparent substrate and having two or more sub-layers, and a value of the ripple at an incident angle of 0° in a wavelength range of 450 nm to 560 nm is less than or equal to 2.5%.

Effects of the Invention

In the present application, a sharp visible light transmission band can be obtained while efficiently and accurately blocking ultraviolet light near the short wavelength visible light region and infrared light near the long wavelength visible light region, and it is possible to provide an optical filter capable of minimizing the ripple phenomenon regardless of the incident angle. In addition, in the present application, even when a near-infrared absorption glass is applied as a substrate, it is possible to provide an optical filter capable of securing the above characteristics and obtaining high visible light transmittance.

BRIEF DESCRIPTION OF DRAWINGS

FIGS. 1 to 5 are drawings showing an exemplary stacked structure of the optical filter of the present application.

BEST MODE FOR IMPLEMENTATION OF THE INVENTION

Figure 6:
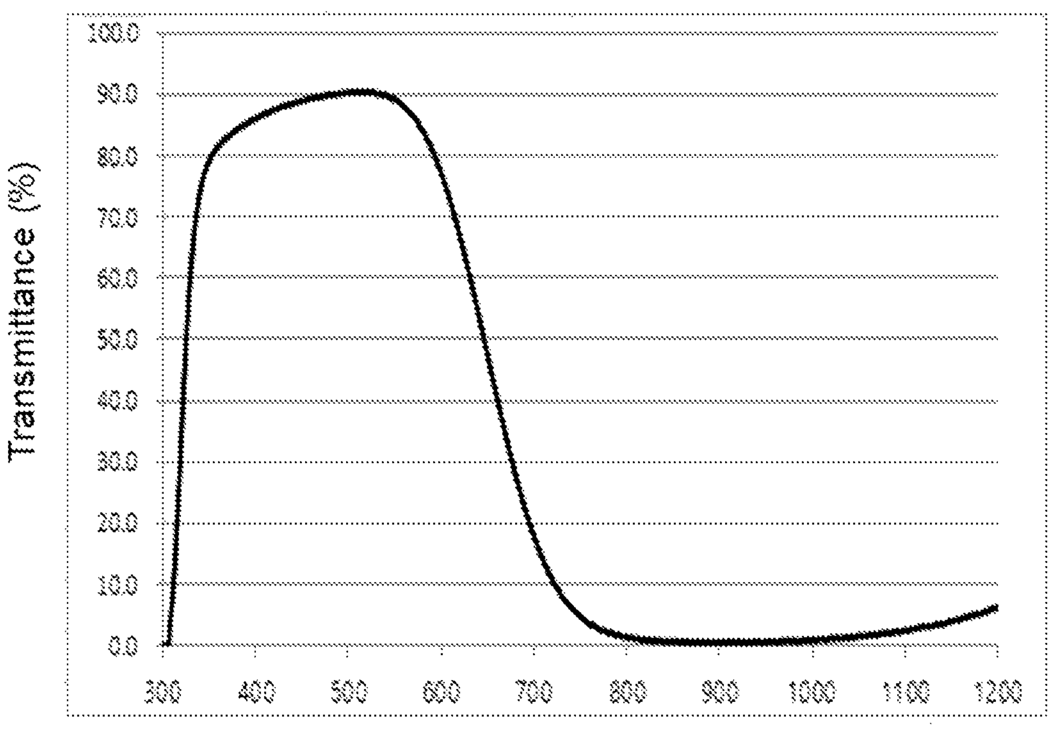
FIG. 6 is a spectral spectrum of a substrate applied in the embodiment.

For those physical properties mentioned in the present application where the result of measuring temperature and/or pressure may affect, it is measured at room temperature and/or atmosphere pressure unless otherwise specified.

The term room temperature refers to a natural temperature that is not heated or not reduced, for example, it means any temperature within the range of 10° C. to 30° C., a temperature of about 23° C. or about 25° C. In addition, in the present specification, the unit of temperature is Celsius (° C.) unless otherwise specified.

The term atmospheric pressure is a natural pressure that is not pressurized or depressurized, and usually means about 1 atmosphere of atmospheric pressure.

In the case of a physical property in which the measured humidity affects the result, the physical property is a physical property measured at natural humidity that is not specifically controlled at the room temperature and/or atmosphere pressure.

In the case where an optical characteristic (e.g., refractive index) referred to in the present application is a characteristic that varies depending on the wavelength, the optical characteristic is a result obtained for light having a wavelength of 520 nm unless otherwise specified.

In the present application, the term transmittance means an actual transmittance (measured transmittance) checked at a specific wavelength unless otherwise specified.

In the present application, the term average transmittance refers to a value obtained by dividing the sum of transmittances for each wavelength in the corresponding wavelength section by the number of wavelengths (N) unless otherwise specified. In this case, the transmittance for each wavelength is obtained in units of 1 nm. For example, the average transmittance in 400 nm to 450 nm is obtained by first finding each transmittance at all 51 wavelength points while increasing by 1 nm from 400 nm to 450 nm, such as 400 nm, 401 nm, and 402 nm, summing the transmittances, and then by dividing the summed transmittances by 51. Such an average transmittance can be calculated by a commonly known transmittance measuring device or software.

In the present application, the term maximum transmittance means the highest transmittance among transmittances (measured transmittance) within a specific wavelength range unless otherwise specified.

In the present application, an incident angle is an angle normal to a surface to be evaluated. For example, a ripple value at an incident angle of 0° of the optical filter means a ripple value for light incident in a direction parallel to the normal of the optical filter surface, and a ripple value at an incident angle of 40° is the ripple value for the incident light forming an angle of 40° in the clockwise or the counterclockwise direction with respect to the normal of the optical filter surface. This definition of the incident angle is equally applied to other characteristics such as transmittance.

The optical filter of the present application can efficiently and accurately block ultraviolet light near a short-wavelength visible light region and infrared light near a long-wavelength visible light region, and can implement a visible light transmission band with high transmittance.

In the present application, the term visible light means light within a range of approximately 400 to 700 nm.

In the present application, the term visible light transmission band refers to a characteristic of a spectral spectrum exhibiting an average transmittance of about 60% or more, 65% or more, 70% or more, 75% or more, 80% or more, 85% or more, or 90% or more in the visible region. The upper limit of the average transmittance in the visible light region is not particularly limited. For example, the average transmittance may be about 100% or less, 95% or less, 90% or less, 85% or less, 80% or less, or 75% or less.

In the present application, the term Tn % cut-on means the shortest wavelength showing n % transmittance in the visible light transmission band, and Tn % cut-off means the longest wavelength showing n % transmittance in the visible light transmission band. For example, T50% cut-on may mean the shortest wavelength indicating 50% transmittance in the visible light transmission band, and T50% cut-off may mean the longest wavelength indicating 50% transmittance in the visible light transmission band.

The optical filter of the present application may exhibit a transmission band having a T50% cut-on wavelength in the range of about 400 to 420 nm. T50% cut-on wavelength of the visible light transmission band can be further adjusted within the range of 402 nm or more, 404 nm or more, 406 nm or more, or 408 nm or more and/or within the range of 418 nm or less, 416 nm or less, 414 nm or less, 412 nm or less, or 410 nm or less.

The optical filter of the present application may exhibit a transmission band having a T50% cut-off wavelength in the range of about 610 to 650 nm. T50% cut-off wavelength of the visible light transmission band can be additionally adjusted within the range of 612 nm or more, 614 nm or more, 616 nm or more, 618 nm or more, 620 nm or more, 622 nm or more, 624 nm or more, 626 nm or more, 628 nm or more, or 630 nm or more and/or within the range of 648 nm or less, 646 nm or less, 644 nm or less, 642 nm or less, 640 nm or less, 638 nm or less, 636 nm or less, 634 nm or less, 632 nm or less, or 630 nm or less.

The optical filter of the present application may have a transmission band exhibiting an average transmittance of 85% or more within a range of 425 to 560 nm. In another example, the average transmittance can be adjusted within the range of 87% or more, 89% or more, 91% or more, or 93% or more and/or within the range of 98% or less, 96% or less, 94% or less, 92% or less, 90% or less, or 88% or less.

The optical filter of the present application may have a transmission band exhibiting a maximum transmittance of 87% or more within a range of 425 to 560 nm. In another example, the maximum transmittance can be adjusted within the range of 89% or more, 91% or more, 93% or more, or 95% or more and/or within the range of 100% or less, 98% or less, 96% or less, 94% or less, 92% or less, or 90% or less.

The optical filter of the present application may have a transmission band exhibiting an average transmittance of 2% or less within a range of 300 to 390 nm. In another example, the average transmittance may be further adjusted within the range of 0% or more, 0.1% or more, or 0.2% or more and/or within the range of 1.8% or less, 1.6% or less, 1.4% or less, 1.2% or less, 1.0% or less, 0.8% or less, 0.6% or less, 0.4% or less, 0.35% or less, or 0.3% or less.

The optical filter of the present application may have a transmission band exhibiting a maximum transmittance of 2% or less within a range of 300 to 390 nm. In another example, the maximum transmittance can be further adjusted within the range of 0% or more, 0.2% or more, 0.4% or more, 0.6% or more, or 0.8% or more and/or within the range of 1.8% or less, 1.6% or less, 1.4% or less, 1.2% or less, or 1.0% or less.

The optical filter of the present application may have a transmittance of 2% or less at a wavelength of 700 nm. In another example, the transmittance can be further adjusted within the range of 0% or more, 0.2% or more, 0.4% or more, 0.6% or more, or 0.8% or more and/or can within the range of 1.8% or less, 1.6% or less, 1.4% or less, 1.2% or less, or 1.0% or less.

The optical filter of the present application may have a transmission band exhibiting an average transmittance of 2% or less within a range of 700 to 800 nm. In another example, the average transmittance may be further adjusted within the range of 0% or more, 0.1% or more, 0.3% or more, 0.4% or more, or 0.5% or more and/or within the range of 1.8% or less, 1.6% or less, 1.4% or less, 1.2% or less, 1.0% or less, 0.8% or less or 0.6% or less.

The optical filter of the present application may have a transmission band exhibiting a maximum transmittance of 2% or less within a range of 700 to 800 nm. In another example, the maximum transmittance can be further adjusted within the range of 0% or more, 0.2% or more, 0.4% or more, 0.6% or more, or 0.8% or more and/or within the range of 1.8% or less, 1.6% or less, 1.4% or less, 1.2% or less, or 1.0% or less.

The optical filter of the present application may have a transmission band exhibiting an average transmittance of 2% or less within a range of 800 to 1000 nm. In another example, the average transmittance may be further adjusted within the range of 0% or more, 0.1% or more, 0.3% or more, 0.4% or more, or 0.5% or more and/or within the range of 1.8% or less, 1.6% or less, 1.4% or less, 1.2% or less, 1.0% or less, 0.8% or less, or 0.6% or less.

The optical filter of the present application may have a transmission band exhibiting a maximum transmittance of 2% or less within a range of 800 to 1000 nm. In another example, the maximum transmittance can be further adjusted within the range of 0% or more, 0.2% or more, 0.4% or more, 0.6% or more, or 0.8% or more and/or within the range of 1.8% or less, 1.6% or less, 1.4% or less, 1.2% or less, or 1.0% or less.

The optical filter of the present application may have a transmission band exhibiting an average transmittance of 5% or less within a range of 1000 to 1200 nm. In another example, the average transmittance may be further adjusted within the range of 0% or more, 0.5% or more, 1% or more, 1.5% or more, 2.0% or more, or 2.5% or more and/or within the range of 4.5% or less, 4% or less, 3.5% or less, 3% or less, or 2.5% or less.

The optical filter of the present application may have a transmission band exhibiting a maximum transmittance of 10% or less within a range of 1000 to 1200 nm. In another example, the maximum transmittance may be further adjusted within the range of 0% or more, 1% or more, 2% or more, 3% or more, 4% or more, or 5% or more and/or within the range of 9% or less, 8% or less, 7% or less, 6% or less, or 5% or less.

The optical filter of the present application may have a transmittance of 10% or less at a wavelength of 1200 nm. In another example, the transmittance can be further adjusted within the range of 1% or more, 2% or more, 3% or more, 4% or more, or 5% or more and/or within the range of 9% or less, 8% or less, 7% or less, 6% or less, or 5.5% or less.

The optical filter of the present application may have a low ripple value, and the low ripple value may be maintained even when the incident angle is changed.

In one example, the optical filter of the present application may have a ripple value of 2.5% or less with respect to an incident angle of 0° in a wavelength region of 450 nm to 560 nm.

The term ripple value is the one obtained after finding all the difference ($=T_{diff.\ i}=T_i-T_{ave.\ i}$)(i=1~n) between the average transmittance ($T_{ave.\ i}$=1~n) and the actual transmittance ($T_i$, i=1~n) in the wavelength region (450 nm to 560 nm), then, subtracting the maximum value ($Max(T_{diff.\ i})$) and minimum value ($Min(T_{diff.\ i})$) of the obtained difference. In the above, the subscript i, which is determined in the range from 1 to n, is an ordinal number indicating a wavelength. For example, when checking the ripple value in the range of 450 nm to 560 nm, 450 nm is designated as a case where i is 1, and when the wavelength increases by 1 nm, i also increases by 1. That is, 451 nm is designated when i is 2, and 560 nm is designated when i is 111. The ripple value is an R value determined according to Equation 1 below. Meanwhile, the average transmittance in the process of obtaining the ripple value is a value calculated by a cubic spline regression equation using the Minitab Tool, which is a statistical analysis program.

$$R=Max(T_{diff.\ i})-Min(T_{diff.\ i}) \quad \text{[Equation 1]}$$

In Equation 1, R is the ripple value, $Max(T_{diff.\ i})$ is the maximum value among the difference between the average transmittance and the actual transmittance, and $Min(T_{diff.\ i})$ is the minimum value among the difference between the average transmittance and the actual transmittance.

The ripple value can be calculated as a cubic spline regression equation using the Minitab Tool, which is a statistical analysis program.

In another example, the ripple value can be adjusted within the range of about 2.4% or less, 2.3% or less, 2.2% or less, 2.1% or less, 2.0% or less, 1.9% or less, 1.8% or less, 1.7% or less, 1.6% or less, 1.5% or less, 1.4% or less, 1.3% or less, or 1.2% or less and/or within the range of 0% or more, 0.2% or more, 0.4% or more, 0.6% or more, 0.8% or more, or 1% or more.

For the optical filter in the present application, the variation of the ripple value with respect to the incident angle hardly occurs or is minimized. For example, in the optical filter of the present application, the absolute value of the difference ($R_0$-$R_{40}$) between the ripple value ($R_0$) for an incident angle of 0° and the ripple value ($R_{40}$) for an incident angle of 40° in a wavelength range of 450 nm to 560 nm may be in the range of 0% to 2.5%. In another example, the absolute value of the difference may be in the range of about 2.4% or less, 2.2% or less, 2.0% or less, 1.8% or less, 1.6% or less, 1.4% or less, 1.2% or less, 1.0% or less, 0.8% or less, 0.6% or less, 0.4% or less, 0.2% or less, 0.1% or less, 0.09% or less, 0.08% or less, 0.07% or less, 0.06% or less, 0.05% or less, or 0.04% or less.

The optical filter of the present application may exhibit any one or a combination of two or more of the above-described optical characteristics, and may suitably satisfy all of the above-described optical characteristics.

The optical filter of the present application may include more layers selected from a group consisting of a dielectric film, an ultraviolet absorption layer, and an infrared absorption layer on one or both surfaces of a transparent substrate. At this time, two or more layers of the dielectric film, the infrared absorption layer, or the ultraviolet absorption layer may be formed. Optical properties including the above-described ripple value and the like can be achieved by selecting and combining an appropriate layer among the respective layers.

Figures 1, 2, 3:
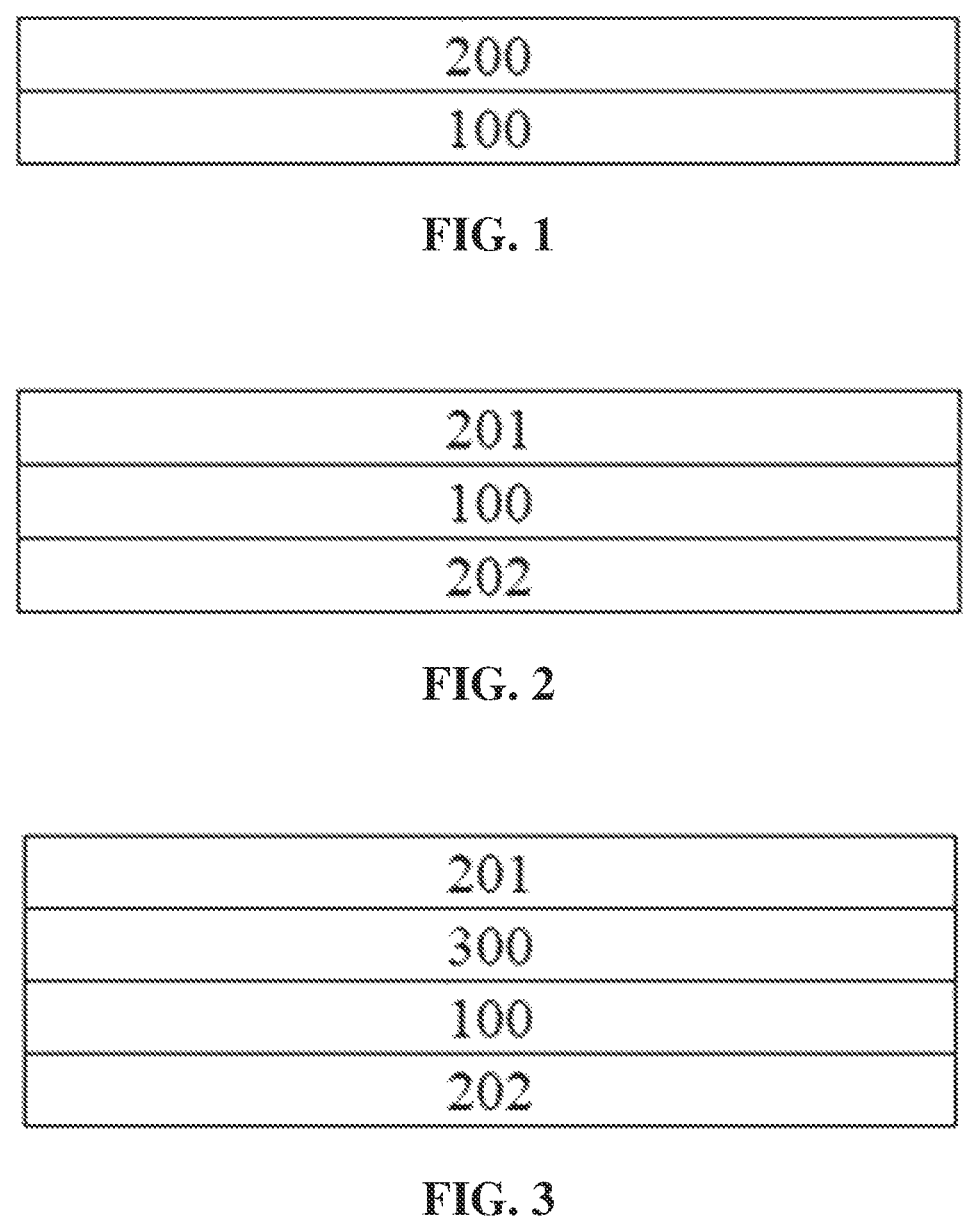

FIGS. 1 and 2 disclose an exemplary structure of optical filter and they show a case where dielectric films 200, 201, and 202 are formed on one or both surfaces of a transparent substrate 100.

A type of the transparent substrate applied to the optical filter is not particularly limited, and an appropriate type may be selected to be used in the configuration of the optical filter.

The term transparent substrate refers to a substrate having a property of transmitting visible light, and for example, it may refer to a substrate having an average transmittance of 70% or more in a wavelength range of about 425 to 560 nm. The average transmittance of the transparent substrate may be further adjusted within the range of 75% or more, 80% or more, or 85% or more, and/or 95% or less, or 90% or less.

For the transparent substrate, a substrate made of various known materials can be applied as long as it exhibits the above transmittance and exhibits physical properties such as appropriate rigidity as the substrate. For example, a substrate made of an inorganic material such as glass or crystal, or an organic material such as a resin can be used.

As a resin material that can be used for the transparent substrate, polyester such as PET (poly(ethylene terephthalate)) or PBT (poly(butylene terephthalate)), polyethylene, polypropylene, or polyolefin such as EVA (ethylene-vinyl acetate copolymer), norbornene polymer, acrylic polymer such as PMMA (polymethyl methacrylate), urethane polymer, vinyl chloride polymer, fluoropolymer, polycarbonate, polyvinyl butyral, polyvinyl alcohol, or polyimide may be exemplified, but the present invention is not limited thereto.

As a glass material which can be used for a transparent substrate, soda-lime glass, borosilicate glass, alkali free glass, quartz glass, etc. are mentioned.

Crystal material that can be used for the transparent substrate includes quartz and birefringent crystal such as niobic acid lithium or sapphire, etc.

The thickness of the transparent substrate may be adjusted within a range of, for example, about 0.03 mm to 5 mm, but is not limited thereto.

For the transparent substrate, a substrate absorbing light near-infrared and/or near-ultraviolet region may be used as a glass known as a so-called near-infrared absorption glass. Such glass is known as an absorption type glass where CuO or the like is added to a fluorophosphate—based glass or a phosphate—based glass and a silicic phosphate—based glass where a part of the glass structure is consisted of $SiO_2$ can be included in the phosphate—based glass.

When the absorption type glass is used as a transparent substrate, the transmittance of the absorption type glass in the near-infrared region can be set to 20% or less by adjusting the added concentration of CuO or the thickness of the substrate. Accordingly, it is possible to improve light-shielding properties against near-infrared light. Such absorption-type glass is known and, for example, glass disclosed in Korean Patent Registration No. 10-2056613 or other commercially available absorption-type glass (e.g., commercially available products such as Hoya, SCHOTT, and PTOT) may be used.

A dielectric film, which may be formed on one or both surfaces of the transparent substrate, is one of the important components so that the optical filter of the present application exhibits the above-described optical properties and, in particular, exhibits a low ripple value. The dielectric film may have a multilayer structure including at least a first sub-layer and a second sub-layer having different refractive indices. In one embodiment, the first and the second sub-layers may have different refractive indices, and the first sub-layer may have a higher refractive index than the second sub-layer. The dielectric film may include a structure where the first and second sub-layers are alternately repeatedly stacked.

In general, a dielectric film is a film constituted by repeatedly stacking a dielectric material having a low refractive index and a dielectric material having a high refractive index, and is used to form a so—called an IR reflecting layer and an AR (Anti-reflection) layer. However, the dielectric film of the present application is formed to secure the above-mentioned optical properties, in particular, a low ripple value. That is, in the present application, by adjusting the refractive index of each sub-layer, the refractive index of the transparent substrate, and the number of sub-layers, optical properties including the above-mentioned low ripple value can be secured, and basically, even when a substrate having poor transmittance characteristics is applied like a near-infrared absorption glass, excellent transmittance characteristics can still be secured.

The dielectric film of the present application is different from the dielectric film as the IR reflective layer and the AR layer, and accordingly, the actual layer configuration is also different.

For example, the dielectric film may be formed such that a V value according to Equation 2 below is 17 or less.

$$V=K\times\{[(n_1/n_2)^{2p}\times(n_1^2/n_s)-1]/[n_1^2/n_2)^{2p}\times(n_1^2/n_s)+1]\})^2 \quad \text{[Equation 2]}$$

In Equation 2, $n_1$ is the refractive index of the first sub-layer, $n_2$ is the refractive index of the second sub-layer, $n_s$ is the refractive index of the transparent substrate, K is the total number of layers of the first and second sub-layers in the dielectric film, and p is a number satisfying K=(2p+1).

V in Equation 2 is written based on an equation for confirming the theoretical reflectivity for effectively blocking the light to be blocked by the IR reflective layer when designing the IR reflective layer and the AR layer. As confirmed through the equation, when the first and second sub-layers are the same, as the values of K and p increase, the value of V increases. Therefore, when designing the existing IR reflective layer or AR layer, the number of layers (K) of the first and second sub-layers is at least 20 or more to secure the intended performance, and in this case, the V value indicates at least more than 20.

However, designing of such layers does not contribute to securing optical properties such as a low ripple value targeted in the present application.

That is, to achieve the object of the present application, it is necessary to adjust the refractive index and the number of layers of each layer so that the V value of Equation 2 is 17 or less.

Although the reason is not clear, a dielectric film that satisfies the above design increases the transmittance of the overall optical filter with the combination of the optical characteristics (e.g., a refractive index) of the transparent substrate and therefore it seems to induce light interference phenomenon that can secure a low ripple value.

In Equation 2, the ratio ($n_1/n_2$) of the refractive index ($n_1$) of the first sub-layer and the refractive index ($n_2$) of the second sub-layer may be in the range of about 1.4 to 2.0 in one example. In another example, the ratio may be about 1.45 or more, 1.5 or more, 1.55 or more, 1.6 or more, 1.65 or more, 1.7 or more, or 1.75 or more, or 1.95 or less, 1.9 or less, 1.85 or less, or 1.8 or less.

In Equation 2, the refractive index $n_1$ of the first sub-layer may be in the range of about 1.8 to 3.5. In another example, the refractive index ($n_1$) may be 2.0 or more, 2.2 or more, 2.4 or more, 2.5 or more, or 2.55 or more, or about 3.3 or less, 3.1 or less, 2.9 or less, or 2.7 or less.

In addition, in Equation 2, the refractive index ($n_2$) of the second sub-layer may be in the range of about 1.1 to 1.7. In another example, the refractive index ($n_2$) may be 1.2 or more, 1.3 or more, or 1.4 or more, or 1.65 or less, 1.6 or less, 1.55 or less, or about 1.5 or less.

It can be defined that a first sub-layer is a layer having a refractive index in the above range, and a second sub-layer has a refractive index in the above range, or a layer having a refractive index satisfying the refractive index of the first sub-layer and the refractive index ratio in the above range among the sub-layers of the dielectric film.

Equation 2 can calculate as to a structure where the first and second sub-layers alternately repeatedly stacked, and in this case where the refractive indexes of the first sub-layers present in two or more layers are different from each other, or the refractive indices of the second sub-layers present in two or more layers are different from each other, when calculating using Equation 2, the arithmetic mean value of the refractive indices of the first sub-layers can be set with $n_1$ in Equation 2, and the arithmetic mean value of the refractive indices of the second sub-layers can be set with $n_2$ in Equation 2.

In Equation 2, the ratio ($n_1/n_s$) of the refractive index ($n_1$) of the first sub-layer and the refractive index ($n_s$) of the transparent substrate may be in the range of about 1.4 to 2.0 in one example. In another example, the ratio may be 1.45 or more, 1.5 or more, 1.55 or more, 1.6 or more, or 1.65 or more, or 1.95 or less, 1.9 or less, 1.85 or less, 1.8 or less, 1.75 or less, or 1.7 or less.

An appropriate material may be selected so that the above range is satisfied in consideration of the refractive index of the transparent substrate.

In Equation 2, K that determines p, that is, the total number of layers of the first sub-layer and the second sub-layer (the number of layers in the first sub-layer+the number of layers in the second sub-layer) is 17 or less, 16 or less, 15 or less, 14 or less, 13 or less, 12 or less, 11 or less, 10 or less, 9 or less, or 8 or less, and in another example, it may be 2 or more, 3 or more, 4 or more, 5 or more, or 6 or more. The dielectric film may include a repeated stacked structure of the first and second sub-layers, and thus, in this case, the number of layers of each of the first and second sub-layers is the same as each other, or one layer can have one or two more layers over another layer.

The respective thickness of the first and the second sub-layers in the dielectric film may be adjusted according to the purpose, but it may be in the range of about 5 to 200 nm. In another example, the thickness is 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, or 85 nm or more, or 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, or 15 nm or less.

An average value (arithmetic mean) of the thickness of the first sub-layers and the thickness of the second sub-layers included in the dielectric film may be in a range of about 5 to 70 nm. In another example, the average value may be 10 nm or more, 15 nm or more, 20 nm or more, 25 nm or more, 30 nm or more, or 35 nm or more, or 65 nm or less, 60 nm or less, 55 nm or less, 50 nm or less, 45 nm or less, or 40 nm or less.

Although the dielectric film may include other sub-layers in addition to the first and second sub-layers, even in such a case, it is necessary to control the thickness of the entire sub-layer being 15 layers or less, 14 layers or less, 13 layers or less, 12 layers or less, 11 layers or less, 10 layers or less, 9 layers or less, 8 layers or less, 7 layers or less, or 6 layers or less and it is also necessary to control the thickness of the entire sub-layer being 2 layers or more, 3 layers or more, 4 layers or more, 5 layers or more, or 6 layers or more.

In addition, even when the dielectric film includes sub-layers other than the first and second sub-layers, it is necessary for the ratio of the total number of layers of the first and second sub-layers as to the total number of sub-layers to be 80% or more, 85% or more, 90% or more, or 95% or more and the upper limit of the ratio is 100%.

Such a dielectric film may have an overall thickness in the range of about 100 to 500 nm. In another example, the thickness may be in the range of 120 nm or more, 140 nm or more, 160 nm or more, 180 nm or more, or 200 nm or more or in the range of 480 nm or less, 460 nm or less, 440 nm or less, 420 nm or less, 400 nm or less, 380 nm or less, 360 nm or less, 340 nm or less, 320 nm or less, 300 nm or less, 280 nm or less, 260 nm or less, 240 nm or less, or 220 nm or less.

For the dielectric film alternately including the first and second sub-layers and also satisfying Equation 2, the first sub-layer may be formed on one surface of the dielectric film and the second sub-layer may be formed on the other surface. For example, the first sub-layer may be formed on the surface of the dielectric film to the transparent substrate, and the second sub-layer may be formed on the opposite surface of the dielectric film. However, the stacking order may be changed.

Through the application of the dielectric film having the above characteristics, it is possible to secure the optical characteristics including the desired low ripple value. Such a dielectric film may be formed on only one surface of the transparent substrate, but may be formed on both surfaces of the transparent substrate as appropriate. In addition, the optical filter may not include other dielectric films other than the dielectric film having a V value of 17 or less in Equation 2 above. That is, when dielectric films are formed on both surfaces of a transparent substrate, it is appropriate that the V values of the dielectric films are 17 or less, respectively.

Material for the dielectric film, that is, the kind of material for forming each of the sub-layers is not particularly limited, and a known material may be utilized. Usually, for the preparation of the low refractive sub-layer, fluoride such as $SiO_2$, $Na_5A_{13}F_{14}$, $Na_3A_1F_6$ or $MgF_2$ is utilized, and for the preparation of the high refractive sub-layer, $TiO_2$, $Ta_2O_5$, $Nb_2O_5$, ZnS, or ZnSe, may be utilized but the material utilized in the present application is not limited thereto.

A method to form a dielectric film as described above is not particularly limited, and, for example, may be formed by applying a known deposition method.

In addition, in the present application, an optical filter can include an absorption layer as an additional layer, and an infrared absorption layer and/or an ultraviolet absorption layer may be exemplified as the absorption layer. These layers are usually layers including an absorbent (pigment, dye, etc.) and a transparent resin, and may be applied to implement a sharper transmittance band by cutting light in the near-ultraviolet region and/or the near-infrared region.

In one example, the ultraviolet absorption layer may be designed to exhibit an absorption maximum in a wavelength region of about 300 to 390 nm, and the infrared absorption layer may be designed to exhibit an absorption maximum in a wavelength region of 600 to 800 nm.

The infrared absorption layer and the ultraviolet absorption layer may be configured as one layer or may be configured as separate layers, respectively. For example, one layer may be designed to exhibit both the absorption maximum of the ultraviolet absorption layer and the absorption maximum of the infrared absorption layer, or two layers showing the respective absorption maximum may be formed. In addition, a plurality of infrared absorption layers and/or ultraviolet absorption layers may be present.

FIG. 3 is a drawing showing an absorption layer 300 and a dielectric film 201 are formed on one surface of the substrate 100 and an additional dielectric film 202 is formed on the other surface of the substrate as an example of the structure of an optical filter. In this case, the absorption layer 300 may be an ultraviolet absorption layer, an infrared absorption layer, or an absorption layer simultaneously showing the absorption maximum of the ultraviolet absorption layer and the infrared absorption layer.

Figures 4, 5:
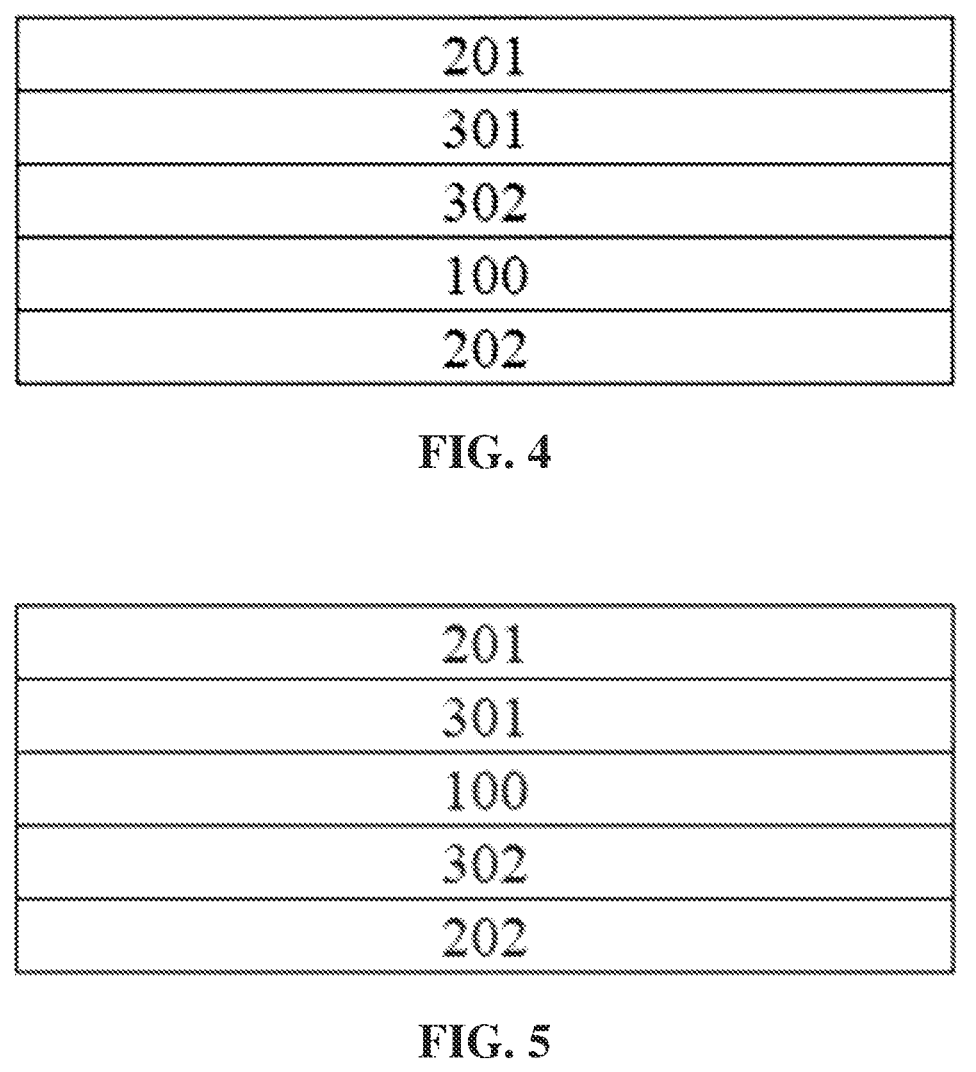

FIGS. 4 and 5 are examples where two absorption layers 301 and 302 are present, and one of the two absorption layers 301, 302 may be an infrared absorption layer, and the other may be an ultraviolet absorption layer.

However, the structure of the optical filter where the absorption layer is formed is not limited to the case of FIGS. 3 to 5, and the number and stacking position of the absorption layer may be appropriately changed.

Each absorption layer may contain only one kind of absorbent, and may contain two or more kinds of absorbents for proper cutting of infrared and/or ultraviolet, if necessary.

For example, the infrared absorption layer may include a first absorbent having an absorption maximum wavelength in a range of 700 to 720 nm and a full width at half maximum in a range of 50 to 60 nm; a second absorbent having an absorption maximum wavelength in the range of 730 to 750 nm and a full width at half maximum in the range of 60 to 70 nm; and a third absorbent having an absorption maximum wavelength in the range of 760 to 780 nm and a full width at half maximum in the range of 90 to 100 nm. The ultraviolet absorption layer may include at least a first absorbent having an absorption maximum wavelength in a range of 340 to 350 nm and a second absorbent having an absorption maximum wavelength in a range of 360 to 370 nm.

Materials constituting the absorption layer are not particularly limited, and known materials and constituition methods may be applied.

Usually, the absorbent layer is formed using a material where an absorbent (dye or pigment, etc.) capable of exhibiting a desired absorption maximum is blended with a transparent resin.

At this time, for example, as the ultraviolet absorbent, a known absorbent exhibiting an absorption maximum in a wavelength region of about 300 to 390 nm may be applied, and for example, such as ABS 407 manufactured by Exiton; UV381A, UV381B, UV382A, UV386A, and VIS404A from QCR Solutions Corp.; ADA1225, ADA3209, ADA3216, ADA3217, ADA3218, ADA3230, ADA5205, ADA3217, ADA2055, ADA6798, ADA3102, ADA3204, ADA3210, ADA2041, ADA2323201, ADA3202, ADA3215, ADA3225, ADA3268, ADA3202, ADA3215, ADA26, ADA3219, ADA3, ADA7226, ADA4634, ADA3213, ADA3227, ADA5922, ADA5950, ADA6752, ADA7130, ADA8212, ADA2984, ADA2999, ADA3220, ADA3228, ADA3235, ADA3240, ADA3211, ADA3221, ADA5220, ADA7158 from HW Sands Corp.; and DLS 381B, DLS 381C, DLS 382A, DLS 386A, DLS 404A, DLS 405A, DLS 405C, DLS 403A from CRYSTALYN Corp., but are not limited thereto.

As the infrared absorbent, an appropriate dye or pigment showing an absorption maximum in a wavelength region of 600 to 800 nm may be used, and for example, squarylium-based dye, cyanine-based compound, phthalocyanine-based compound, naphthalocyanine-based compound, or dithiol metal complex-based compound may be used, but is not limited thereto.

A transparent resin applying for the absorption layer may also be used from a known resin, for example, one or more of cyclic olefin resin, polyarylate resin, polysulfone resin, polyether sulfone resin, polyparaphenylene resin, polyarylene ether phosphine oxide resin, polyimide resin, polyetherimide resin, polyamideimide resin, acrylic resin, polycarbonate resin, polyethylene naphthalate resin, and various organic-inorganic hybrid resins may be used.

In addition to the above-described layers, the optical filter may be added with various necessary layers within a range that does not impair the desired effect.

This application also relates to an optical filter including the near-infrared absorption glass substrate, the ultraviolet absorption layer and the infrared absorption layer. The above-mentioned dielectric film may also be formed in this optical filter. Such an optical filter may exhibit at least any one, two or more, or all of the above-described transmittance characteristics (visible light transmittance band).

For example, the optical filter can also exhibit a visible light transmission band exhibiting an average transmittance of approximately 60% or more, 65% or more, 70% or more, 75% or more, 80% or more, 85% or more, or 90% or more in the visible region in the spectral spectrum. The upper limit of the average transmittance in the visible light region is not particularly limited. For example, the average transmittance may be about 100% or less, 95% or less, 90% or less, 85% or less, 80% or less, or 75% or less.

The optical filter may also exhibit a transmission band with a T50% cut-on wavelength in the range of about 400 to 420 nm. T50% cut-on wavelength of the visible light transmission band can be adjusted within the range of 402 nm or more, 404 nm or more, 406 nm or more or 408 nm or more and/or further within the range of 418 nm or less, 416 nm or less, 414 nm or less, 412 nm or less or 410 nm or less.

The optical filter may also exhibit a transmission band with a T50% cut-off wavelength in the range of about 610 to 650 nm. T50% cut-off wavelength of the visible light transmission band can be adjusted within the range of 612 nm or more, 614 nm or more, 616 nm or more, 618 nm or more, 620 nm or more, 622 nm or more, 624 nm or more, 626 nm or more, 628 nm or more, or 630 nm or more and/or further within the range of 648 nm or less, 646 nm or less, 644 nm or less, 642 nm or less, 640 nm or less, 638 nm or less, 636 nm or less, 634 nm or less, 632 nm or less, or 630 nm or less.

The optical filter may also have a transmission band exhibiting an average transmittance of 85% or more within a range of 425 to 560 nm. In another example, the average transmittance can be adjusted within the range of 87% or more, 89% or more, 91% or more, or 93% or more and/or within the range of 98% or less, 96% or less, 94% or less, 92% or less, 90% or less, or 88% or less.

The optical filter may have a transmission band exhibiting a maximum transmittance of 87% or more within a range of 425 to 560 nm. In another example, the maximum transmittance can be adjusted within the range of 89% or more, 91% or more, 93% or more, or 95% or more and/or within the range of 100% or less, 98% or less, 96% or less, 94% or less, 92% or less, or 90% or less.

The optical filter may have a transmission band exhibiting an average transmittance of 2% or less within a range of 300 to 390 nm. In another example, the average transmittance can be adjusted within the range of 0% or more, 0.1% or more, or 0.2% or more and/or further within the range of 1.8% or less, 1.6% or less, 1.4% or less, 1.2% or less, 1.0% or less, 0.8% or less, 0.6% or less, 0.4% or less, 0.35% or less, or 0.3% or less.

The optical filter may have a transmission band exhibiting a maximum transmittance of 2% or less within a range of 300 to 390 nm. In another example, the maximum transmittance can be adjusted within the range of 0% or more, 0.2% or more, 0.4% or more, 0.6% or more, or 0.8% or more and/or further within the range of 1.8% or less, 1.6% or less, 1.4% or less, 1.2% or less, or 1.0% or less.

The optical filter may have a transmittance of 2% or less at a wavelength of 700 nm. In another example, the transmittance can be adjusted within the range of 0% or more, 0.2% or more, 0.4% or more, 0.6% or more, or 0.8% or more and/or further within the range of 1.8% or less, 1.6% or less, 1.4% or less, 1.2% or less, or 1.0% or less.

The optical filter may have a transmission band exhibiting an average transmittance of 2% or less within a range of 700 to 800 nm. In another example, the average transmittance can be adjusted within the range of 0% or more, 0.1% or more, 0.3% or more, 0.4% or more, or 0.5% or more and/or further within the range of 1.8% or less, 1.6% or less, 1.4% or less, 1.2% or less, 1.0% or less, 0.8% or less, or 0.6% or less.

The optical filter may have a transmission band exhibiting a maximum transmittance of 2% or less within a range of 700 to 800 nm. In another example, the maximum transmittance can be adjusted within the range of 0% or more, 0.2% or more, 0.4% or more, 0.6% or more, or 0.8% or more and/or further within the range of 1.8% or less, 1.6% or less, 1.4% or less, 1.2% or less, or 1.0% or less.

The optical filter may have a transmission band exhibiting an average transmittance of 2% or less within a range of 800 to 1000 nm. In another example, the average transmittance may be adjusted within the range of 0% or more, 0.1% or more, 0.3% or more, 0.4% or more, or 0.5% or more and/or further within the range of 1.8% or less, 1.6% or less, 1.4% or less, 1.2% or less, 1.0% or less, 0.8% or less, or 0.6% or less.

The optical filter may have a transmission band exhibiting a maximum transmittance of 2% or less within a range of 800 to 1000 nm. In another example, the maximum transmittance can be adjusted within the range of 0% or more, 0.2% or more, 0.4% or more, 0.6% or more, or 0.8% or more and/or further within the range of 1.8% or less, 1.6% or less, 1.4% or less, 1.2% or less, or 1.0% or less.

The optical filter may have a transmission band exhibiting an average transmittance of 5% or less within a range of 1000 to 1200 nm. In another example, the average transmittance may be adjusted within the range of 0% or more, 0.5% or more, 1% or more, 1.5% or more, 2.0% or more, or 2.5% or more and/or further within the range of 4.5% or less, 4% or less, 3.5% or less, 3% or less, or 2.5% or less.

The optical filter may have a transmission band exhibiting a maximum transmittance of 10% or less within a range of 1000 to 1200 nm. In another example, the maximum transmittance may be adjusted within the range of 0% or more, 1% or more, 2% or more, 3% or more, 4% or more, or 5% or more and/or further within the range of 9% or less, 8% or less, 7% or less, 6% or less, or 5% or less.

The optical filter may have a transmittance of 10% or less at a wavelength of 1200 nm. In another example, the transmittance can be adjusted within the range of 1% or more, 2% or more, 3% or more, 4% or more, or 5% or more and/or further within the range of 9% or less, 8% or less, 7% or less, 6% or less, or 5.5% or less.

The optical filter can have a ripple value within the above-described range, and the low ripple value may be maintained even when an incident angle is changed.

Consequently, the ripple value at an incident angle of 0° of the optical filter and the ripple value at the incident angle of 0° and the ripple value at the incident angle of 40° may be within the above-described ranges.

As described above, an infrared absorption glass (a so-called blue glass) shows an absorption characteristic with respect to a near-infrared region by itself, but the characteristic of accurately blocking ultraviolet light in the short wavelength region of visible light and infrared light in the long wavelength region of visible light is poor, and therefore it is difficult to obtain a sharp transmittance band of visible light.

However, in the present application, by properly forming the above-described ultraviolet absorption layer and/or infrared absorption layer, even when the near-infrared absorption glass is applied, the above-described excellent spectral spectrum can be obtained.

Specific types of the absorption layer and/or the ultraviolet absorption layer that can be applied at this time are as described above.

The present application also relates to an imaging capturing device including the optical filter. In this case, the configuration method of the imaging capturing device or the application method of the optical filter is not particularly limited, and known configurations and application methods may be applied.

In addition, the use of the optical filter of the present application is not limited to the imaging capturing device, and may be applied to various other applications requiring near-infrared cut (e.g., a display device such as a PDP, etc.).

Below, the present application will be described in detail through examples, but the scope of the present application is not limited by the examples below.

1. Evaluation of Transmittance Spectrum

A transmittance spectrum of an infrared absorption glass (infrared absorption substrate) and a stacked layer structure (optical filter, etc.) where an infrared absorption layer, an ultraviolet absorption layer, and/or a dielectric film are formed on the glass was measured from an obtained specimen by cutting the absorption glass to be a certain size (width, length and thickness of 10 mm, 10 mm and 0.2 mm, respectively) using a spectrophotometer (manufacturer: Perkinelmer, product name: Lambda750 spectrophotometer). The transmittance spectrum was measured for each wavelength and incident angle according to the manual of the equipment. The specimen (infrared absorption glass, etc.) was placed on a straight line between the measuring beam of the spectrophotometer and the detector, and the transmittance spectrum was checked while changing the angle of incidence of the measuring beam from 0° to 40°. Unless otherwise specified, the transmittance spectrum results in this example are the results when the incident angle is 0°, and in this case, the incident angle 0° is a direction parallel to the surface normal direction of the specimen.

2. Evaluation of Refractive Index

A refractive index of the infrared absorption glass and the dielectric sub-layer was measured with respect to a wavelength of 520 nm by utilizing Wiz Optics. Ellipsometer (M-2000 ® Ellipsometer).

Preparation Example 1: Preparation of UV Absorption Layer Material

An ultraviolet absorption layer material was prepared by mixing a triazine—based dye exhibiting an absorption maximum within a range of about 340 to 390 nm with a binder resin. As the binder resin, a polymethyl methacrylate (PMMA) binder was used. A material was prepared by mixing the binder resin and the absorbent in cyclohexanone, and about 5 parts by weight of the dye was mixed with respect to 100 parts by weight of the binder resin.

Preparation Example 2: Preparation of Near-Infrared Absorption Layer Material

A near-infrared absorption layer was prepared using an infrared absorbent (1) (squarylium-based dye) having an absorption maximum wavelength in a range of about 700 to 720 nm and having a full width at half maximum (FWHM) of about 50 to 60 nm (squarylium-based dye), an infrared absorbent (2) having an absorption maximum wavelength in a range of about 730 to 750 nm and a full width at half maximum (FWHM) of about 60 to 70 nm, and an infrared absorbent (3) (squarylium-based dye) having an absorption maximum wavelength of about 760 to 780 nm and having a full width at half maximum (FWHM) of about 90 to 100 nm.

The above three types of infrared absorbents were blended with a binder resin to prepare a material. Cycloolefin polymer (COP) was used as the binder resin.

The material was prepared by mixing the binder resin and the absorbent with toluene, and the mixing ratio was 0.1 parts by weight, 0.2 parts by weight and 0.4 parts by weight of the absorbent (1), the absorbent (2) and the absorbent (3) with respect to 100 parts by weight of the binder resin, respectively.

Example 1

As a substrate, a near-infrared absorption glass having a transmittance spectrum as shown in FIG. 6 was used. The near-infrared absorption glass is a glass to which absorption properties are given by including a coloring component such as copper ions, and is also called as a blue glass, and a commercially available product from PTOT Corp. was used in this example. The spectral characteristics of the near-infrared absorption glass are summarized in Table 1 below.

The near-infrared absorption glass had a refractive index of about 1.57.

An ultraviolet absorption layer was formed on one surface of the near infrared absorption glass using an ultraviolet absorption layer material. The ultraviolet absorption layer was formed by coating the material of Preparation Example 1 on the near-infrared absorption glass and drying it in a furnace at 140° C. for about 2 hours to have a thickness of about 3 μm.

Figure 7:
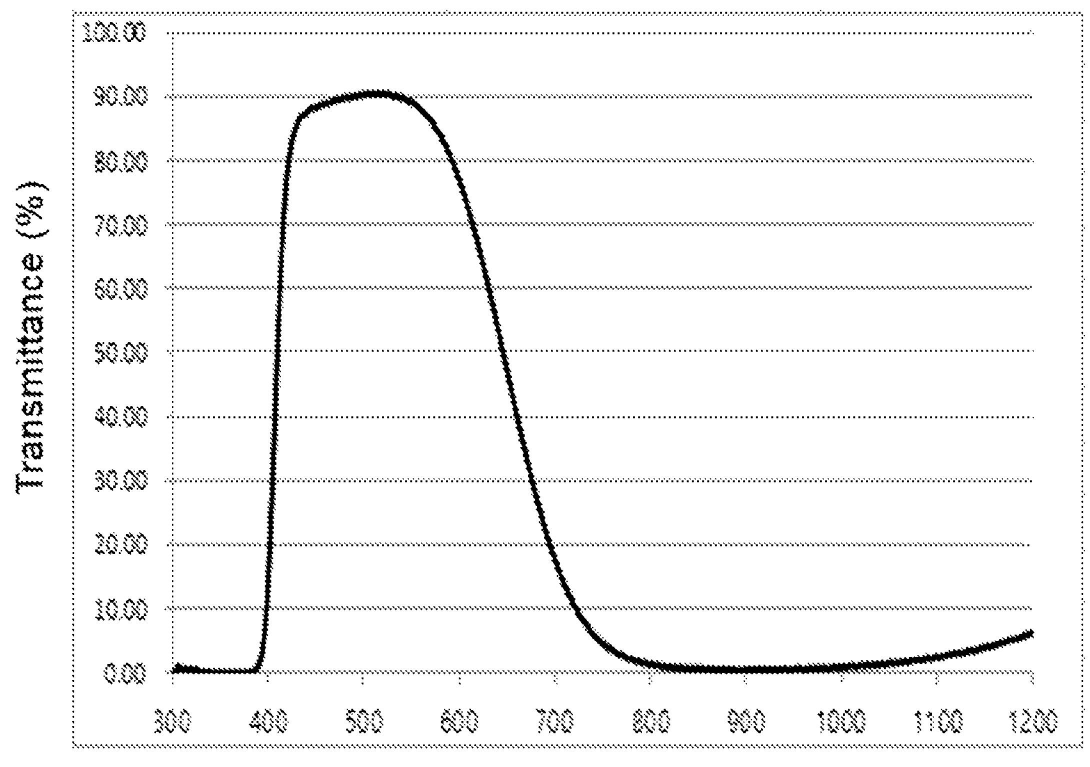
FIG. 7 is a spectral spectrum when an ultraviolet absorption layer is formed on the substrate of FIG. 6.

The transmittance spectrum in the state where the ultraviolet absorption layer is formed is shown in FIG. 7. As shown in FIG. 7, it can be confirmed that the transmittance of the ultraviolet region (about 300 to 390 nm wavelength range) formed by the ultraviolet absorption layer is reduced to 1% or less and the T50% cut-on wavelength of the visible light transmission band is shifted to a longer wavelength.

Figure 8:
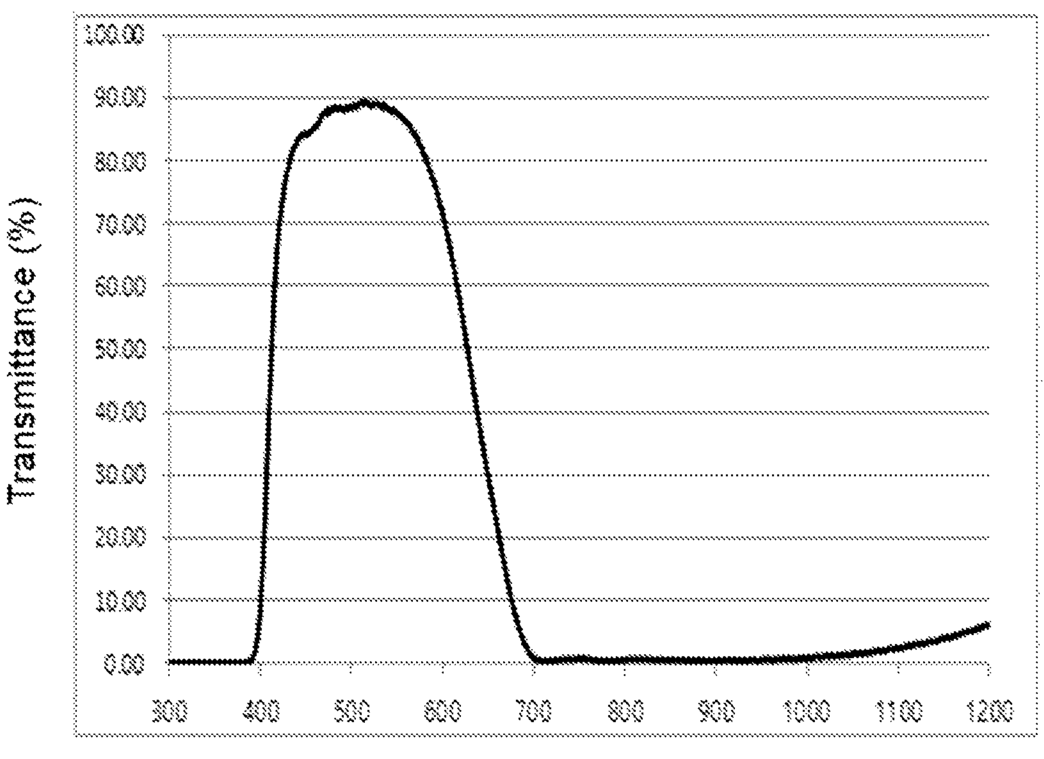
FIG. 8 is a spectral spectrum when an infrared absorption layer is formed in the structure of FIG. 7.

An infrared absorption layer was formed on the ultraviolet absorption layer by using the infrared absorption layer material of Preparation Example 2. The infrared absorption layer was formed to have a thickness of about 3.5 μm by drying the material of Preparation Example 2 in a furnace at 130° C. for 2 hours. The transmittance spectrum in the state where the infrared absorption layer is formed is shown in FIG. 8. As shown in FIG. 8, it can be confirmed that the transmittance of the infrared region (about 700 to 1000 nm wavelength range) formed by the infrared absorption layer is reduced to 1% or less, and the T50% cut-off wavelength of the visible light transmission band is shifted to a shorter wavelength.

A dielectric film was formed on a glass where the ultraviolet and infrared absorption layer is formed. The dielectric film is formed by depositing a sub-layer by ion-beam assisted deposition. Vacuum level and temperature condition during the deposition were set to be 5.0E-5 Torr and 120° C., respectively, and IBS (Ion Beam Sputtering) source voltage and current was set to be 350 V and 850 mA, respectively. In the above manner, the dielectric film was formed by alternately depositing a $TiO_2$ layer (refractive index of about 2.61)—high refractive layer and a $SiO_2$ layer (refractive index of about 1.46)—low refractive layer.

A total of six high refractive layers and low-refractive layers, which became a sub-layer, were formed, and specifically, a $TiO_2$ layer (thickness about 12.4 nm), a $SiO_2$ layer (thickness about 30.3 nm), a $TiO_2$ layer (thickness about 43.7 nm), a $SiO_2$ (thickness about 13 nm), a $TiO_2$ layer (thickness about 30.4 nm) and a $SiO_2$ layer (thickness about 85.3 nm) layer were sequentially formed on the infrared absorption layer to form a dielectric film. In this dielectric film, $n_1$ of the following Equation 1 is about 2.61 (the refractive index of the $TiO_2$ layer), $n_2$ is about 1.46 (the refractive index of the $SiO_2$ layer), and $n_s$ is about 1.57 (the refractive index of the near-infrared absorption glass), p is 2.5(=(6−1)/2), and V is about 5.70.

$$V=K\times\{[(n_1/n_2)^{2p}\times(n_1^2/n_s)-1]/[(n_1/n_2)^{2p}\times(n_1^2/n_s)+1]\}^2 \quad \text{[Equation 2]}$$

As a next step, an optical filter was prepared to include a dielectric film being present on both sides by sequentially forming a $TiO_2$ layer (thickness about 12.4 nm), a $SiO_2$ layer (thickness about 30.3 nm), a $TiO_2$ layer (thickness about 43.7 nm), and a $SiO_2$ layer (thickness about 13 nm), a $TiO_2$ layer (thickness about 30.4 nm) and a $SiO_2$ layer (thickness about 85.3 nm) on the surface of the near-infrared absorption glass where the infrared absorption layer was not formed, and consequently, having the $SiO_2$ layer (thickness about 85.3 nm) as an outermost layer.

Figure 9:
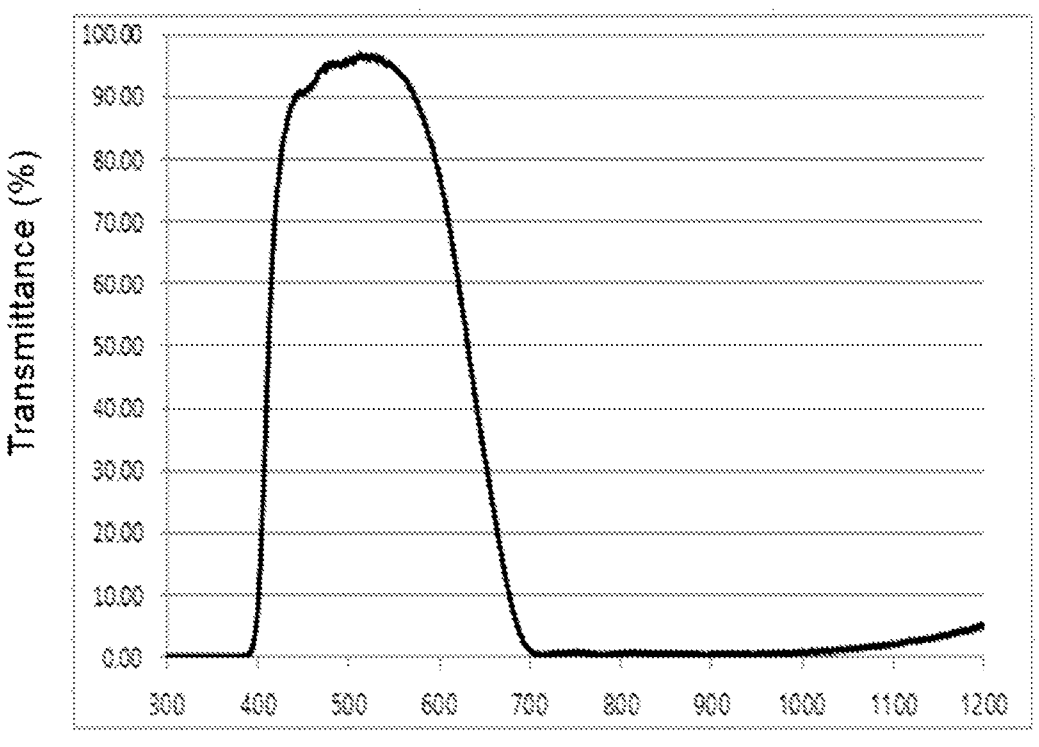
FIG. 9 is a spectral spectrum of an optical filter where a dielectric film is formed in the structure of FIG. 8.

The spectrum of the optical filter is shown in FIG. 9. As shown in FIG. 9, it can be seen that the visible light transmittance of the optical filter is higher than the visible light transmittance of the near-infrared absorption glass, and the T50% cut-off wavelength of the visible light transmitting band is shifted to a longer wavelength.

Table 1 below shows a summary of the transmittance spectral characteristics of the near-infrared absorption glass, the near-infrared absorption glass with an ultraviolet absorption layer (filter A), a case where an infrared absorption layer is formed on the filter A (filter B), and an optical filter having a dielectric film having a V value of 5.70 formed on both sides of the filter B. The unit of transmittance in Table 1 below is %.

The average transmittance ($T_{ave}$) in Table 1 below is a value obtained by dividing the sum of transmittances for each wavelength in the corresponding wavelength section by the number of wavelengths (N), as described above, and in this case, the transmittance for each wavelength was calculated in units of 1 nm.

TABLE 1

| | | Near-infrared Absorption Glass | Filter A | Filter B | Optical Filter |
|---|---|---|---|---|---|
| 300-390 nm | $T_{max}$ | 84.40 | 0.98 | 0.98 | 0.98 |
| Wavelength Range | $T_{ave}$ | 63.51 | 0.20 | 0.20 | 0.20 |
| T50% cut-on wavelength | | 325 nm | 409.6 nm | 409.6 nm | 409.6 nm |
| 425-560 nm | $T_{max}$ | 90.42 | 90.42 | 89.35 | 96.78 |
| Wavelength Range | $T_{ave}$ | 89.53 | 89.13 | 86.57 | 93.49 |
| T50% cut-off wavelength | | 646 nm | 645.9 nm | 627 nm | 632 nm |
| 700 nm transmittance | | 17.7 | 17.7 | 0.9 | 1.0 |
| 700-800 nm | $T_{max}$ | 17.7 | 17.7 | 0.9 | 1.0 |
| Wavelength Range | $T_{ave}$ | 6.3 | 6.3 | 0.5 | 0.6 |
| 800-1000 nm | $T_{max}$ | 1.3 | 1.3 | 0.9 | 0.8 |
| Wavelength Range | $T_{ave}$ | 0.7 | 0.7 | 0.6 | 0.6 |
| 1000-1200 nm | $T_{max}$ | 6.2 | 6.2 | 6.2 | 5.2 |
| Wavelength Range | $T_{ave}$ | 2.8 | 2.8 | 2.8 | 2.4 |
| 1200 nm transmittance | | 6.2 | 6.2 | 6.2 | 5.2 |

Comparative Example 1

An optical filter was prepared as same as in Example 1 by forming a total of 19 layers of dielectric films having high refractive index and low refractive index stacking on an infrared absorption layer by the ion-beam assisted deposition in the same manner of Example 1 except forming 22 layers of dielectric film formed on the near-infrared absorption glass where the infrared absorption layer was not formed by the same manner. The dielectric film formed on the infrared absorption layer is to exhibit the so-called AR (anti-reflection) layer having visible light reflection preventing properties, and the dielectric film formed on the near-infrared absorption glass is formed to exhibit the properties of the so-called IR layer having infrared reflecting properties.

The forming material and thickness of the dielectric film having the IR and AR layer characteristics, and the stacking order are shown in Tables 2 and 3 below. Accordingly, the V value of the dielectric film having the IR layer characteristic is 21.9 and the V value of the dielectric film having the AR layer characteristic is about 18.9.

TABLE 2

| Stacking Order | Material | Thickness (nm) |
|---|---|---|
| 1 | $SiO_2$ | 77.5 |
| 2 | $TiO_2$ | 92.1 |
| 3 | $SiO_2$ | 160.7 |
| 4 | $TiO_2$ | 88.6 |
| 5 | $SiO_2$ | 153.9 |
| 6 | $TiO_2$ | 85.2 |
| 7 | $SiO_2$ | 151.6 |
| 8 | $TiO_2$ | 83.7 |
| 9 | $SiO_2$ | 150.2 |
| 10 | $TiO_2$ | 83.5 |
| 11 | $SiO_2$ | 150.4 |
| 12 | $TiO_2$ | 83.4 |
| 13 | $SiO_2$ | 150.1 |
| 14 | $TiO_2$ | 83.8 |
| 15 | $SiO_2$ | 151.5 |
| 16 | $TiO_2$ | 85.8 |
| 17 | $SiO_2$ | 155.7 |
| 18 | $TiO_2$ | 89.6 |
| 19 | $SiO_2$ | 164.7 |
| 20 | $TiO_2$ | 101.3 |
| 21 | $SiO_2$ | 36.5 |
| 22 | $TiO_2$ | 9.15 |

TABLE 3

| Stacking Order | Material | Thickness (nm) |
|---|---|---|
| 1 | $SiO_2$ | 87.7 |
| 2 | $TiO_2$ | 104.2 |
| 3 | $SiO_2$ | 180.1 |
| 4 | $TiO_2$ | 108.7 |
| 5 | $SiO_2$ | 184.8 |
| 6 | $TiO_2$ | 110.9 |
| 7 | $SiO_2$ | 186.0 |
| 8 | $TiO_2$ | 111.2 |
| 9 | $SiO_2$ | 187.4 |
| 10 | $TiO_2$ | 111.4 |
| 11 | $SiO_2$ | 186.3 |
| 12 | $TiO_2$ | 111.4 |
| 13 | $SiO_2$ | 186.1 |
| 14 | $TiO_2$ | 109.2 |
| 15 | $SiO_2$ | 181.0 |
| 16 | $TiO_2$ | 111.6 |
| 17 | $SiO_2$ | 41.8 |
| 18 | $TiO_2$ | 10.1 |
| 19 | $SiO_2$ | 57.3 |

Test Example 1

Figure 10:
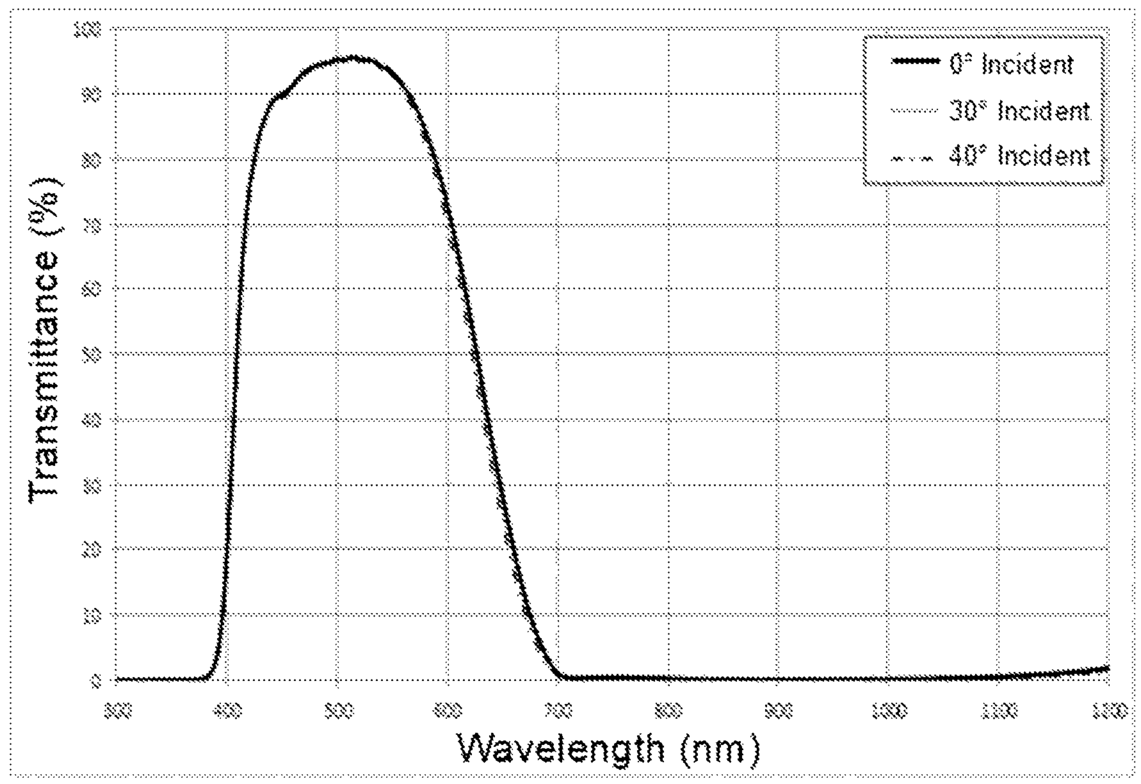
FIG. 10 is a spectral spectrum with respect to the incident angle of the optical filter of the embodiment.

The transmittance spectra at the incident angle of 0°, 30° and 40° as to the optical filter prepared in Example was evaluated and the results are shown in FIG. 10. As can be seen from FIG. 10, the optical filter of Example exhibited almost the same spectrum regardless of the incident angle. In addition, the T10% cut-on and the T10% cut-off of the visible light transmission band did not substantially shift with respect to the incident angle.

Figure 11:
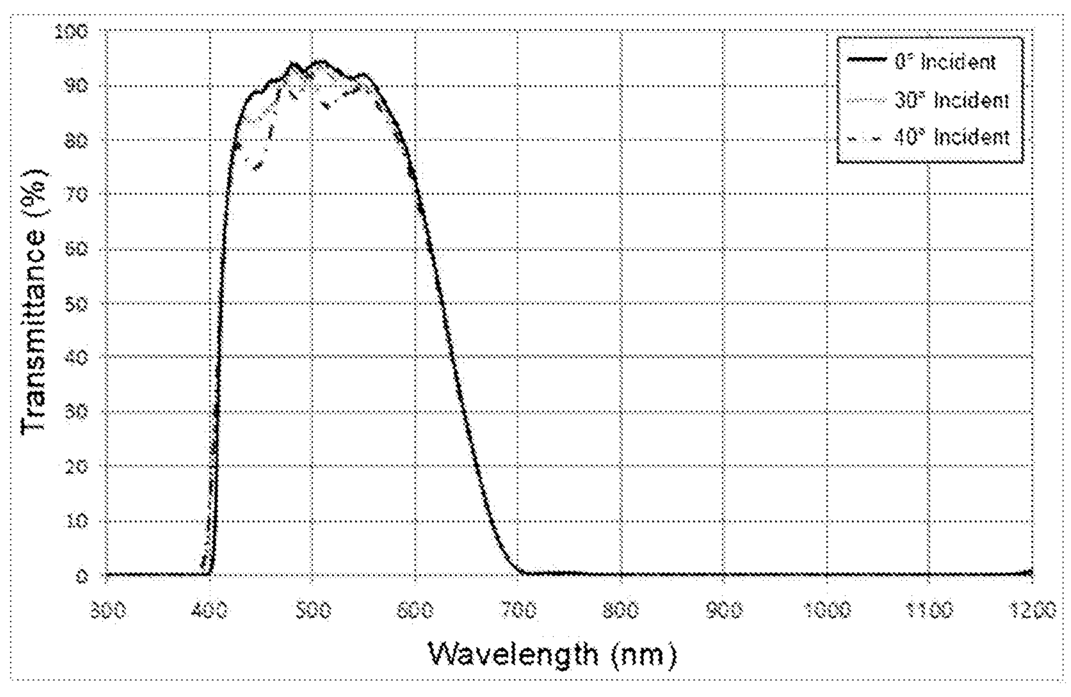
FIG. 11 is a spectral spectrum with respect to an incident angle of an optical filter of a comparative example.

FIG. 11 shows transmittance spectra at the incident angle of 0°, 30° and 40°, respectively, as to Comparative Example 1. As can be seen from FIG. 11, in Comparative Example 1, the T10% cut-on of the visible light transmission band was shifted by 5 nm or more with respect to the incident angle.

Test Example 2

Figure 12:
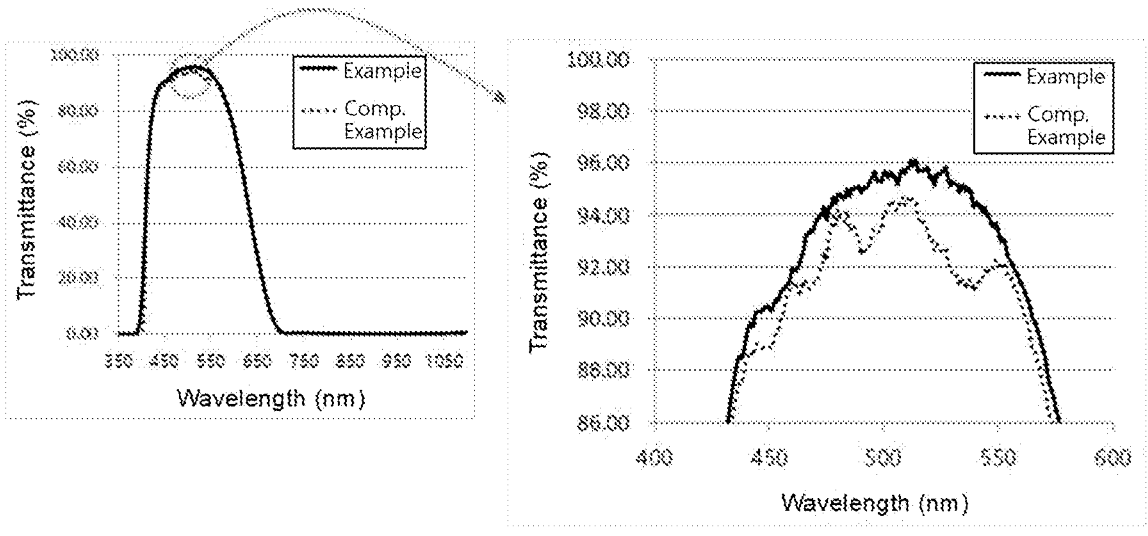
FIGS. 12 to 14 are spectra for confirming the ripple values of the optical filters of embodiments or comparative examples.

FIG. 12 is an enlarged view of transmittance spectra at a wavelength within a range of 450 nm to 560 nm (incident angle 0°) to confirm the ripple values of the optical filters of Examples and Comparative Examples.

As is clear from the figure, for the case of the optical filter of Comparative Example 1, it can be expected that the transmittance fluctuation with respect to the wavelength significantly occurs and thus exhibits a large ripple value, whereas in the optical filter of Example 1, the fluctuation is almost was not observed.

Figure 13:
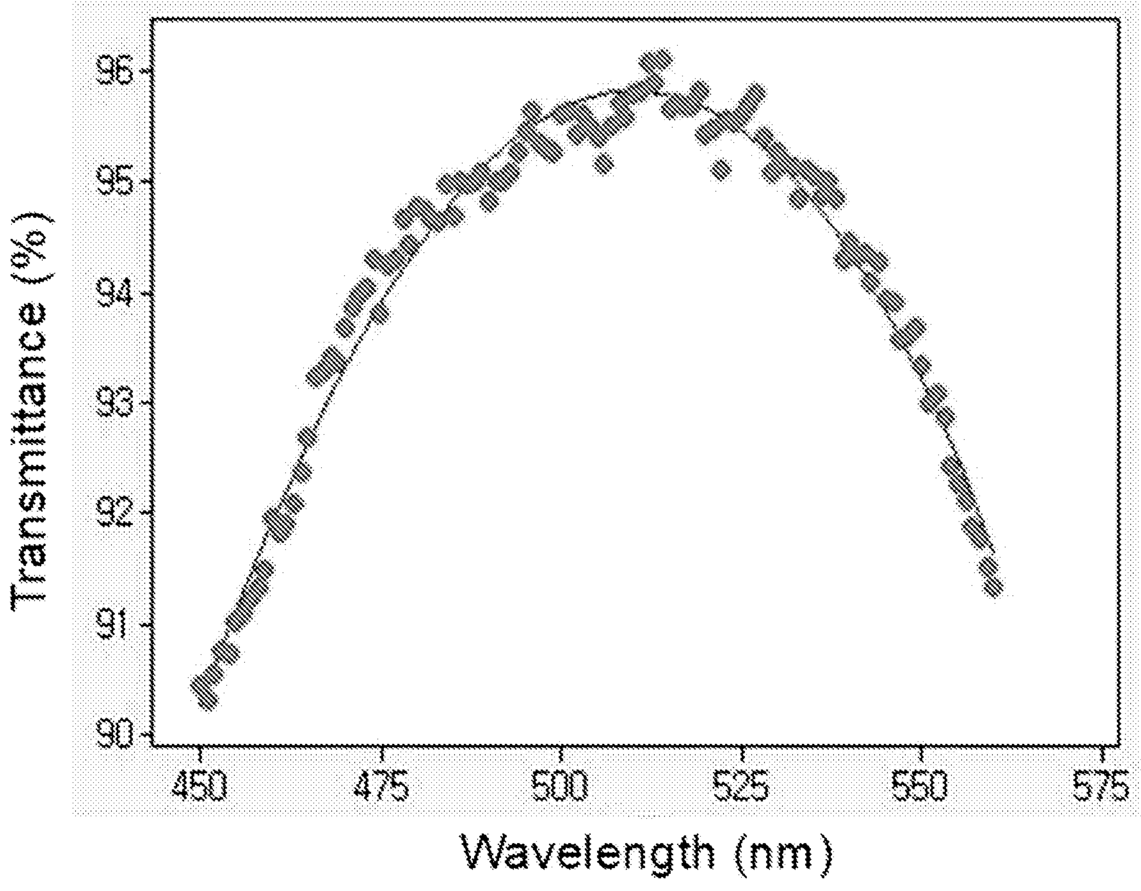
Figure 14:
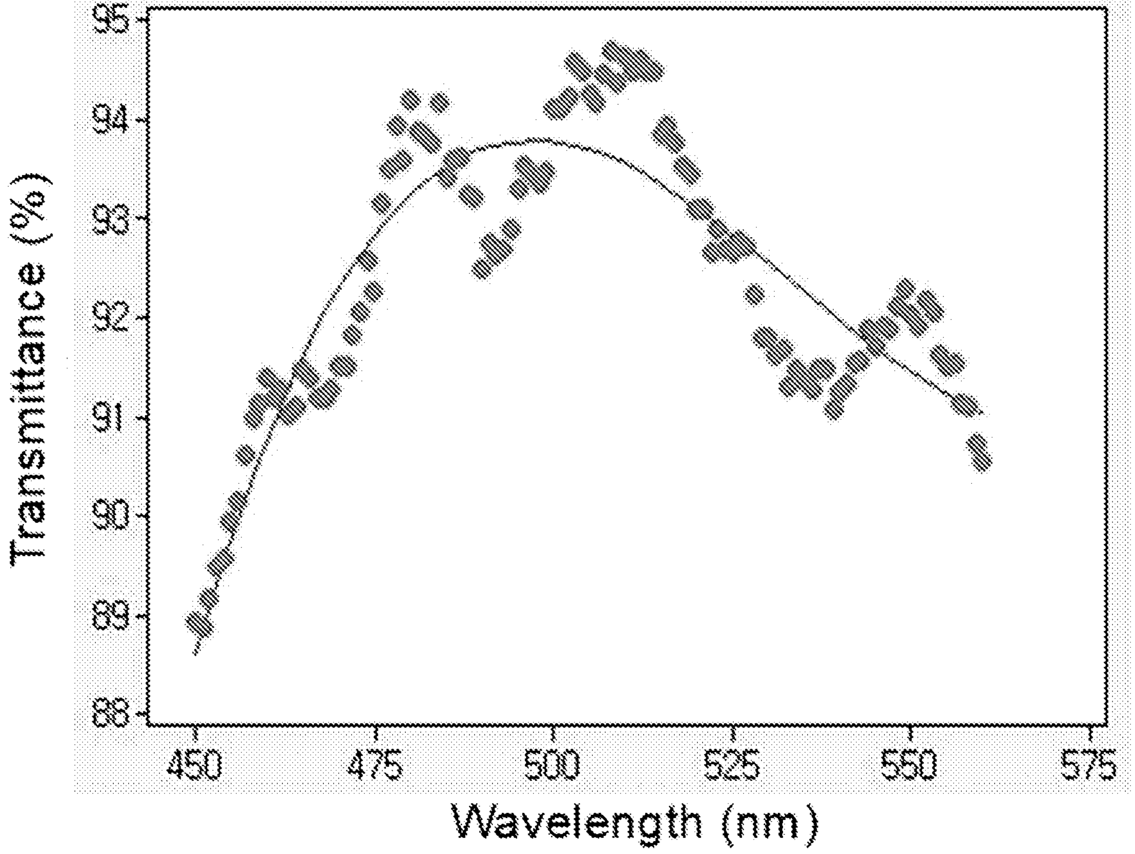

FIGS. 13 and 14 are enlarged views of the average value (solid line) and the measured value (dot) of the transmittance within the range of 450 to 560 nm to confirm the ripple values of Example 1 and Comparative Example 1, respectively (incident angle: 0°) and the difference between Example 1 and Comparative Example 1 can be more clearly identified in the figures.

For Example 1, the ripple value at 0° of incidence was about 1.17%, the ripple value at 40° of incidence was about 1.20%, and the ripple value at 0° of incidence for Comparative Example 1 was about 2.40%, and the ripple value at an incident angle of 40° was about 7.08%.

The average value of transmittance (average transmittance) for confirming the ripple value is a value calculated using a regression equation of a cubic spline method using the Minitab Tool which is a statistical analysis program.

What is claimed is:

1. An optical filter comprising:

a transparent substrate being a near-infrared absorption glass substrate; and a dielectric film formed on one or both surfaces of the transparent substrate and comprising two or more sub-layers including a first sub-layer and a second sub-layer having different refractive indices and alternately stacked, wherein a ripple value at an incident angle of 0° is 2.5% or less in a wavelength range of 450 nm to 560 nm, wherein the first sub-layer and the second sub-layer are formed such that a V value according to the following Equation 2 is 17 or less:

$$V=K\times\{[(n_1/n_2)^{2p}\times(n_1^2/n_s)-1]/[(n_1/n_2)^{2p}\times(n_1^2/n_s)+1]\}^2, \quad \text{[Equation 2]}$$

wherein $n_1$ is a refractive index of the first sub-layer, $n_2$ is a refractive index of the second sub-layer, $n_s$ is a refractive index of the transparent substrate, K is a total number of the first sub-layer and the second sub-layer in the dielectric film being 15 or less, p is a number satisfying K=(2p+1), and a ratio of the total number of the first sub-layers and the second sub-layers to the total number of the two or more sublayers is 80% or more.

2. The optical filter of claim 1, wherein an absolute value of the difference between the ripple value at the incident angle of 0° (R0) and a ripple value at an incident angle of 40° (R40) in the wavelength range of 450 nm to 560 nm is in a range of 0 to 2.5%.

3. The optical filter of claim 1, further comprising a transmission band, wherein a T50% cut-on wavelength is in a range of 400 to 420 nm, a T50% cut-off wavelength is in a range of 610 to 650 nm, and an average transmittance is 85% or more in a wavelength range of 425 to 560 nm.

4. The optical filter of claim 3, wherein a maximum transmittance in the wavelength range of 425 to 560 nm is 87% or more.

5. The optical filter of claim 3, having an average transmittance of 2% or less and a maximum transmittance within a wavelength range of 300 to 390 nm.

6. The optical filter of claim 3, having a transmittance at a wavelength of 700 nm of 2% or less; an average transmittance of 2% or less and a maximum transmittance within a wavelength range of 700 to 800 nm; an average transmittance of 2% or less and a maximum transmittance within a wavelength range of 800 to 1000 nm; an average transmittance of 5% or less and a maximum transmittance of 10% or less within a wavelength range of 1000 to 1200 nm; and a transmittance of 10% or less at a wavelength of 1200 nm.

7. The optical filter of claim 1, wherein the transparent substrate is a CuO containing fluorophosphate glass substrate or a CuO containing phosphate glass substrate.

8. The optical film of claim 1, wherein a ratio $(n_1/n_2)$ of the refractive index $(n_1)$ of the first sub-layer and the refractive index $(n_2)$ of the second sub-layer is in a range of 1.4 to 2.0.

9. The optical filter of claim 8, wherein the refractive index $n_1$ of the first sub-layer is in a range of 1.8 to 3.5.

10. The optical filter of claim 1, wherein a ratio $(n_1/n_s)$ of the refractive index $(n_1)$ of the first sub-layer and the refractive index $(n_s)$ of the transparent substrate is in a range of 1.4 to 2.0.

11. The optical filter of claim 1, wherein a thickness of the first sub-layer and the second sub-layer are in a range of 5 to 200 nm, respectively, and an average value of the thickness of the first sub-layer and the thickness of the second sub-layer included in the dielectric film is in a range of 5 to 70 nm.

12. An imaging capturing device comprising the optical filter of claim 1.

* * * * *